US011909114B2

(12) United States Patent
Reveles et al.

(10) Patent No.: US 11,909,114 B2
(45) Date of Patent: Feb. 20, 2024

(54) DEPLOYABLE MEMBRANE STRUCTURE FOR AN ANTENNA

(71) Applicant: Oxford Space Systems Limited, Didcot (GB)

(72) Inventors: Juan Reveles, Longworth (GB); Matthew Rowe, Compton (GB); Alex Brinkmeyer, Oxford (GB); Deborah Fellows, Didcot (GB)

(73) Assignee: Oxford Space Systems Limited, Harwell (GB)

( * ) Notice: Subject to any disclaimer, the term of this patent is extended or adjusted under 35 U.S.C. 154(b) by 0 days.

(21) Appl. No.: 18/078,794

(22) Filed: Dec. 9, 2022

(65) Prior Publication Data

US 2023/0104909 A1 Apr. 6, 2023

Related U.S. Application Data

(63) Continuation of application No. 15/734,391, filed as application No. PCT/GB2019/051837 on Jun. 28, 2019, now Pat. No. 11,552,406.

(30) Foreign Application Priority Data

Jun. 28, 2018 (GB) ...................................... 1810642

(51) Int. Cl.
*H01Q 15/16* (2006.01)
*H01Q 1/28* (2006.01)

(52) U.S. Cl.
CPC ........... *H01Q 15/162* (2013.01); *H01Q 1/288* (2013.01); *H01Q 15/161* (2013.01); *H01Q 15/165* (2013.01)

(58) Field of Classification Search
CPC ..... H01Q 15/162; H01Q 15/165; H01Q 1/288
See application file for complete search history.

(56) References Cited

U.S. PATENT DOCUMENTS

| | | | | |
|---|---|---|---|---|
| 3,717,879 | A | 2/1973 | Ganssle | |
| 4,445,121 | A | 4/1984 | Hancock et al. | |
| 11,552,406 | B2 * | 1/2023 | Reveles ............... | H01Q 15/161 |

FOREIGN PATENT DOCUMENTS

| | | |
|---|---|---|
| EP | 1243506 | 9/2002 |
| JP | 2006229750 A | 8/2006 |

OTHER PUBLICATIONS

Japan Patent Office, Office Action, dated Aug. 22, 2023.

(Continued)

*Primary Examiner* — Daniel Munoz

(74) *Attorney, Agent, or Firm* — Ryan Dean; Umberg Zipser LLP

(57) ABSTRACT

A deployable membrane structure for an antenna comprises a membrane comprising a plurality of first regions of higher-stiffness material integrally connected via one or more second regions of lower-stiffness material, wherein the one or more second regions are formed from compliant material configured to permit the membrane to be folded into a collapsed configuration and subsequently unfolded into a deployed configuration, and are arranged so as to allow adjacent ones of the plurality of first regions to be folded so as to lie against one another. In some embodiments the membrane is formed of a composite material comprising a plurality of fibres in a compliant matrix, and the plurality of first regions comprise material with a higher fibre density than the one or more second regions. A deployable antenna comprising the deployable membrane structure is also disclosed.

20 Claims, 4 Drawing Sheets

(56) References Cited

OTHER PUBLICATIONS

European Patent Office, International Search Report and Written Opinion, International Application No. PCT/GB2019/051837, International Filing Date Jun. 28, 2019, 7 pages.

* cited by examiner

DEPLOYABLE MEMBRANE STRUCTURE FOR AN ANTENNA

The application is a continuation application of U.S. patent application Ser. No. 15/734,391 filed on Dec. 2, 2020, which itself is a 371 application of PCT application no. PCT/GB2019/051837 filed on Jun. 28, 2019, which claims priority to UK patent application no. 1810642.7 filed on Jun. 28, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

TECHNICAL FIELD

The present invention relates to deployable structures. More particularly, the present invention relates to a deployable membrane structure for an antenna.

BACKGROUND

Deployable structures are used in a variety of applications to allow the physical size of an apparatus to be temporarily reduced. For example, in space-based applications such as satellites or space vehicles, deployable structures can be provided to allow the apparatus to be collapsed into a small volume and loaded into the payload bay of a launch vehicle. Once launched into space and released from the payload bay, the deployable structure can be moved into a deployed configuration for operation of the satellite or vehicle.

Deployable structures are commonly used as reflectors in antennas. A large reflector area is desirable as this increases the antenna capabilities, by allowing more energy to be received and/or transmitted by the antenna. However, a large reflector can make the antenna unwieldy and difficult to transport. Deployable reflectors have been developed which use a thin flexible membrane to form the surface of the reflector. The membrane can be collapsed into a small space. However, high stowage efficiency requires a highly compliant membrane with adequate level of in-plane and out-of-plane stiffness to ensure dimensional stability. Typically a complex backing structure is used to deploy and to hold the membrane in the desired shape once deployed and to increase the overall stiffness of the system, thereby reducing the effect of undesirable external disturbances on the membrane geometry. Deployable backing structures typically include a framework of struts connected by hinges, which inevitably increases the overall cost, complexity and mass of the deployable reflector. The invention is made in this context.

SUMMARY OF THE INVENTION

According to a first aspect of the present invention, there is provided a deployable membrane structure for an antenna, the deployable membrane structure comprising a membrane comprising a plurality of first regions of higher-stiffness material integrally connected via one or more second regions of lower-stiffness material, wherein the one or more second regions are formed from compliant material configured to permit the membrane to be folded into a collapsed configuration and subsequently unfolded into a deployed configuration, and are arranged so as to allow adjacent ones of the plurality of first regions to be folded so as to lie against one another.

In some embodiments according to the first aspect, in the collapsed configuration adjacent ones of the plurality of first regions are folded about a respective one of the one or more second regions which connects said adjacent first regions, so as to lie against one another.

In some embodiments according to the first aspect, the membrane comprises a continuous matrix extending throughout the plurality of first regions and the one or more second regions.

In some embodiments according to the first aspect, the membrane is formed of a composite material comprising a plurality of fibres in a compliant matrix.

In some embodiments according to the first aspect, the plurality of first regions comprise material with a higher fibre density than the one or more second regions, and/or comprise a first matrix material having a higher stiffness than a second matrix material included in the one or more second regions.

In some embodiments according to the first aspect, the plurality of fibres comprise a plurality of first fibres distributed over the plurality of first regions and the one or more second regions, and a plurality of second fibres confined to the plurality of first regions, wherein the plurality of second fibres act to reinforce the membrane in the plurality of first regions.

In some embodiments according to the first aspect, the plurality of fibres are carbon fibres.

In some embodiments according to the first aspect, the membrane is configured to adopt a parabolic form in the deployed configuration.

In some embodiments according to the first aspect, the second regions are arranged in strips along the radial and circumferential directions when the membrane is in the deployed configuration.

In some embodiments according to the first aspect, the plurality of first regions are electrically connected to one another.

In some embodiments according to the first aspect, adjacent ones of the plurality of first regions are spaced apart from each other by a respective one of the one or more second regions.

In some embodiments according to the first aspect, said adjacent ones of the plurality of first regions and said respective one of the one or more second regions are electrically connected to one another.

In some embodiments according to the first aspect, the plurality of first regions and the one or more second regions are formed of a composite material comprising electrically conductive fibres.

In some embodiments according to the first aspect, the composite material is a carbon fibre reinforced silicone CFRS composite.

In some embodiments according to the first aspect, the membrane comprises a substrate, one or more reinforcing members disposed in one of the plurality of first regions to reinforce the membrane in said one of the plurality of first regions, and one or more openings formed in the substrate beneath said one or more reinforcing members.

In some embodiments according to the first aspect, said one or more reinforcing members extend across the one or more openings in the substrate so as to maintain a continuous surface of the membrane in said one of the plurality of first regions.

According to a second aspect of the present invention, there is provided a deployable antenna comprising a deployable membrane structure according to the first aspect, configured to form the primary reflector of the antenna when in the deployed configuration, and an antenna feed for transmitting or receiving a signal via the deployable membrane structure when the membrane is in the deployed configuration.

BRIEF DESCRIPTION OF THE DRAWINGS

Embodiments of the present invention will now be described, by way of example only, with reference to the accompanying drawings, in which.

DETAILED DESCRIPTION

Figure 1:
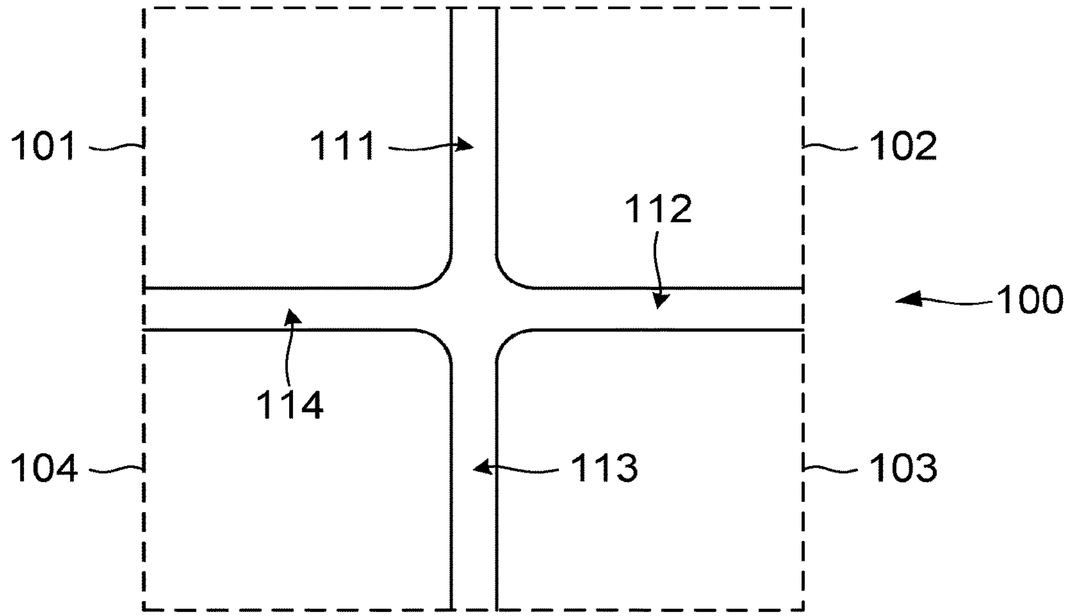
FIG. 1 illustrates a deployable membrane structure, according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Figure 2:
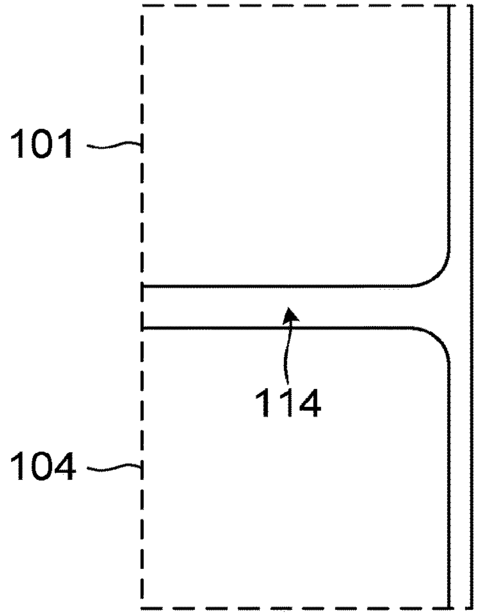
FIG. 2 illustrates the deployable membrane structure of FIG. 1 after folding along a strip of low-stiffness material integral to the membrane, according to an embodiment of the present invention.
Figure 3:
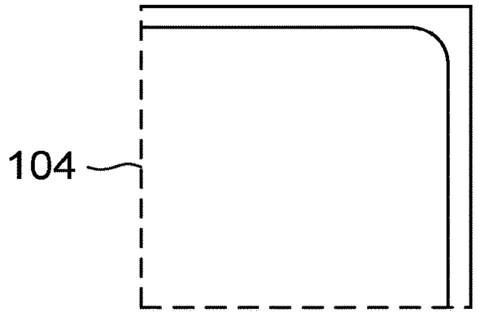
FIG. 3 illustrates the deployable membrane structure of FIG. 1 in a fully-collapsed configuration, according to an embodiment of the present invention.

Referring now to FIGS. 1 to 3, part of a deployable membrane structure 100 is illustrated according to an embodiment of the present invention. FIG. 1 illustrates the deployable membrane structure 100 in a deployed configuration, FIG. 2 illustrates the deployable membrane structure 100 in a semi-collapsed configuration after folding along a strip of low-stiffness material integral to the membrane, and FIG. 3 illustrates the deployable membrane structure 100 in a fully-collapsed configuration. In the deployed configuration the membrane can form the reflector of an antenna.

The deployable membrane structure 100 comprises a membrane which can be folded into a collapsed configuration and subsequently unfolded into a deployed configuration. The membrane comprises a plurality of first regions of higher-stiffness material 101, 102, 103, 104, which are integrally connected to one another via one or more second regions of lower-stiffness material 111, 112, 113, 114.

The second regions 111, 112, 113, 114 provide lines of lower-stiffness material in the structure which permit the membrane to be folded into the collapsed configuration. The second regions 111, 112, 113, 114 can be formed from a resilient material capable of withstanding the stresses that occur when folding the structure whilst suffering little or no damage as a result. The material properties of the second regions 111, 112, 113, 114 may be tailored to a particular application, to allow the membrane to be repeatedly folded and deployed many times without suffering damage that might otherwise significantly degrade the performance of the antenna.

The first regions 101, 102, 103, 104, which are formed from material which has a higher stiffness than the second regions 111, 112, 113, 114, ensure dimensional stability of the structure in the deployed configuration. Each of the first regions 101, 102, 103, 104 may be formed as a closed-cell continuous membrane. The first regions 101, 102, 103, 104 may reflect high-frequency radio frequency (RF) signals more efficiently than the lower-stiffness material of the second regions 111, 112, 113, 114 as a result of the first regions 101, 102, 103, 104 being formed of a stiffer, higher-density material than the second regions 111, 112, 113, 114. The second regions 111, 112, 113, 114 may also be formed from a material that is a good RF reflector, to ensure satisfactory performance across the whole surface of the antenna. The first regions 101, 102, 103, 104 therefore allow an antenna to achieve high operating frequencies when the deployed membrane is used as a reflector in the antenna. Depending on the antenna configuration, the deployed membrane structure may be used as the primary reflector or as a secondary reflector. In embodiments in which an electrically conductive reflector is required, for example in an RF antenna, the plurality of first regions 101, 102, 103, 104 may be electrically connected to each other, for example by means of electrically conductive fibres embedded in the membrane. Having the first regions electrically connected to each other improves the performance of the antenna. However, in some applications satisfactory performance may still be achieved without the first regions being electrically connected to one another. For example, in some embodiments the more compliant second regions which connect the less compliant first regions may comprise electrically insulating material, such that the plurality of higher-stiffness first regions are electrically isolated from one another.

Figure 4:
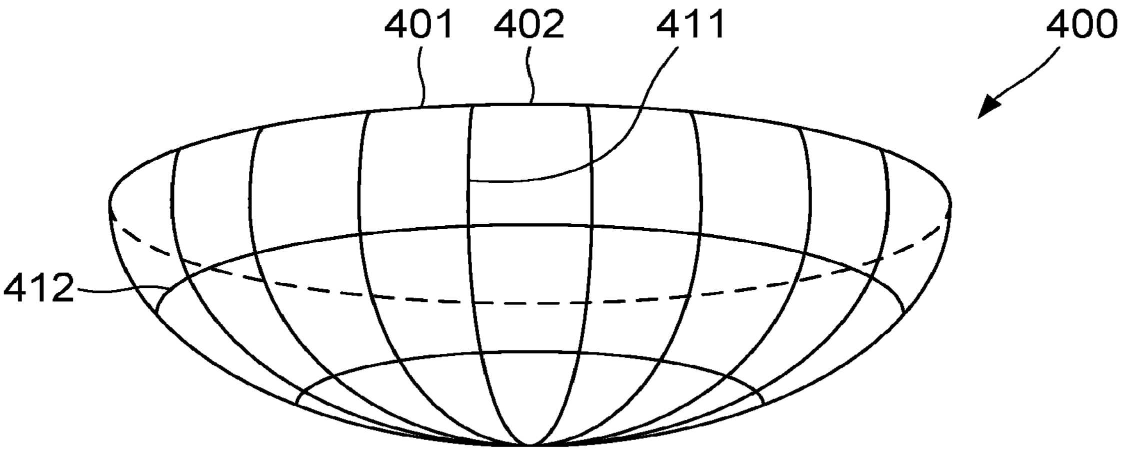
FIG. 4 illustrates a deployable membrane structure configured to form a parabolic reflector of an antenna, according to an embodiment of the present invention.

In the present embodiment the part of the membrane illustrated in FIG. 1 comprises four first regions 101, 102, 103, 104 and four second regions 111, 112, 113, 114. Each second region 111, 112, 113, 114 connects two adjacent first regions 101, 102, 103, 104. In the present embodiment the four second regions 111, 112, 113, 114 are arranged in the shape of a cross, to allow the membrane to be folded along the horizontal and vertical centre lines. In other embodiments different numbers and arrangements of first regions and second regions may be provided. The arrangement illustrated in FIG. 1 may be repeated across a larger structure. For example, in a parabolic reflector 400 as shown in FIG. 4 each intersection between four adjacent regions can have a configuration similar to the one shown in FIG. 1.

FIG. 2 illustrates the deployable membrane structure 100 after folding along the vertical centre line. The configuration illustrated in FIG. 2 may be referred to as a partially-collapsed configuration or a partially-deployed configuration. In a partially-collapsed configuration, the structure 100 can either be unfolded or can be folded into a configuration with a smaller footprint. The configuration illustrated in FIG. 3 may be referred to as a fully-collapsed configuration, since the structure 100 has been folded along all of the second regions 111, 112, 113, 114 and so the size of the structure 100 cannot be reduced further.

In order to achieve a high reduction in the overall size of the structure in the collapsed configuration, in the present embodiment the second regions 111, 112, 113, 114 are arranged so as to allow adjacent ones of the plurality of first regions 101, 102, 103, 104 to be folded so as to lie against one another. For example, in the semi-collapsed configuration shown in FIG. 2, a first one of the first regions 101 is folded about a first one of the second regions 111 so as to lie against a second one of the first regions 102, and a fourth one of the first regions 104 is folded about a third one of the second regions 113 so as to lie against a third one of the first regions 103. The first one of the second regions 111 is a region which connects the first one of the first regions 101 to the second one of the first regions 102, and the third one of the second regions 113 is a region which connects the third one of the first regions 103 to the fourth one of the first regions 104. In the fully-collapsed configuration shown in FIG. 3, the structure is further folded along second and fourth ones of the second regions 112, 114, such that the second and third ones of the second regions 102, 103 lie against one another.

In some embodiments, adjacent ones of the plurality of first regions 101, 102, 103, 104 may be spaced apart from each other by a respective one of the second regions 111, 112, 113, 114. In other words, a surface of one of the second regions 111, 112, 113, 114 may be exposed between two adjacent first regions 101, 102, 103, 104. This arrangement can make it easier to fold the adjacent first regions so as to lie against one another in the collapsed configuration, and can reduce the risk of damage occurring to the material in the second region by increasing the bend radius when folding the first regions about the second region. Additionally, in embodiments in which adjacent first regions are spaced apart by one of the second regions such that a surface of the second region is exposed, the antenna performance can be improved by forming the second region from electrically conductive material.

The membrane may comprise a continuous matrix extending throughout the plurality of first regions 101, 102, 103, 104 and the one or more second regions 111, 112, 113, 114. In some embodiments the membrane can be formed of a composite material comprising a plurality of fibres in a compliant matrix, for example a carbon fibre composite. The plurality of fibres may be arranged as a continuous or discrete fibre-based weave, and may provide the main structure of the membrane. The plurality of fibres are embedded in the compliant matrix, which binds the fibres together. The matrix may be formed from any suitable material, for example compliant epoxy or silicone. In some embodiments the membrane may comprise a weave of electrically-conducting fibres, such as carbon fibres, in order to electrically connect the plurality of first regions 101, 102, 103, 104 to one another. In embodiments in which the second regions are also formed from electrically conductive material, as described above, adjacent first regions 101, 102, 103, 104 and the connecting second region may all be electrically connected together via electrically conductive fibres. For example, the first and second regions 101, 102, 103, 104, 111, 112, 113, 114 may be formed of a carbon fibre reinforced silicone (CFRS) composite material. Using an electrically conductive material for the second regions 111, 112, 113, 114 ensures that the areas of exposed material in the second regions 111, 112, 113, 114 can act as an RF reflector, and therefore ensures satisfactory performance at RF frequencies across the whole surface of the antenna.

The use of a composite material allows the mechanical properties of the membrane to be precisely controlled in each of the first and second regions 101, 102, 103, 104, 111, 112, 113, 114, for example by varying such parameters as the matrix composition, fibre dimensions, weight percent (wt %) and/or orientation. When a fibre composite is used to form the membrane, a higher fibre density may be used in the plurality of first regions 101, 102, 103, 104 relative to the fibre density in the second regions 111, 112, 113, 114, in order to increase the stiffness of the membrane in the first regions 101, 102, 103, 104 relative to the stiffness of the membrane in the second regions 111, 112, 113, 114. A higher fibre density can also increase the operating frequency of the reflector, by reducing the spacing between conductive fibres.

In some embodiments a different matrix may be used in the first regions 101, 102, 103, 104 in comparison to the second regions 111, 112, 113, 114 in order to provide the necessary properties, instead of or in addition to varying other parameters of the composite such as the fibre dimensions, wt % or fibre orientation. The plurality of first regions 101, 102, 103, 104 may comprise a first matrix material having a higher stiffness than a second matrix material included in the one or more second regions. For example, the first matrix material may be epoxy resin and the second matrix material may be silicone.

In the present embodiment, a separate deployment mechanism may be used to unfold the membrane from the collapsed configuration into the deployed configuration. The membrane can be formed so as to automatically adopt the shape that is required for the reflector as the structure approaches the deployed configuration. For example, the membrane may be configured to adopt a parabolic form in the deployed configuration, such as a symmetric paraboloid shape or a section of a symmetric paraboloid. In this way the shape of the reflector is controlled by the membrane rather than the deployment mechanism. This allows the complexity of the deployment mechanism to be reduced in comparison to prior art deployable antennas, in which a complex backing structure is required to not only deploy the reflector but also to hold the reflector in the desired shape once deployed.

In other embodiments the membrane may be pre-shaped so as to automatically adopt the desired three-dimensional shape in the deployed configuration. For example, the membrane may be pre-shaped in a suitable mould. When a composite material is used, the fibres may be laid up in the mould and coated with a liquid or gel which, when cured, forms a pre-shaped compliant matrix in which the fibres are embedded. For example, in some embodiments the fibres can be coated with a low viscosity silicone gel which, when cured, forms a compliant matrix. When the membrane is folded into the collapsed configuration, the deformed matrix and fibres in the second regions can store elastic energy which can be used to assist in the process of unfolding and deploying the structure. For example, in embodiments in which a backing structure is used to deploy the membrane, the backing structure may need to exert less force than is the case for conventional deployable antennas, since some of the energy for driving the deployment process can be provided by the stored elastic strain energy in the membrane structure. Accordingly, the size and mass of the backing structure may be reduced in comparison to conventional deployable antennas.

Referring now to FIGS. 4 to 8, a deployable membrane structure 400 configured to form a parabolic reflector of an antenna is illustrated, according to an embodiment of the present invention. As with the deployable membrane structure 100 of FIGS. 1 to 3, the parabolic deployable membrane structure 400 of the present embodiment comprises a plurality of first regions 401, 402 of higher-stiffness material connected by a plurality of second regions 411, 412 of lower-stiffness material.

Figure 5:
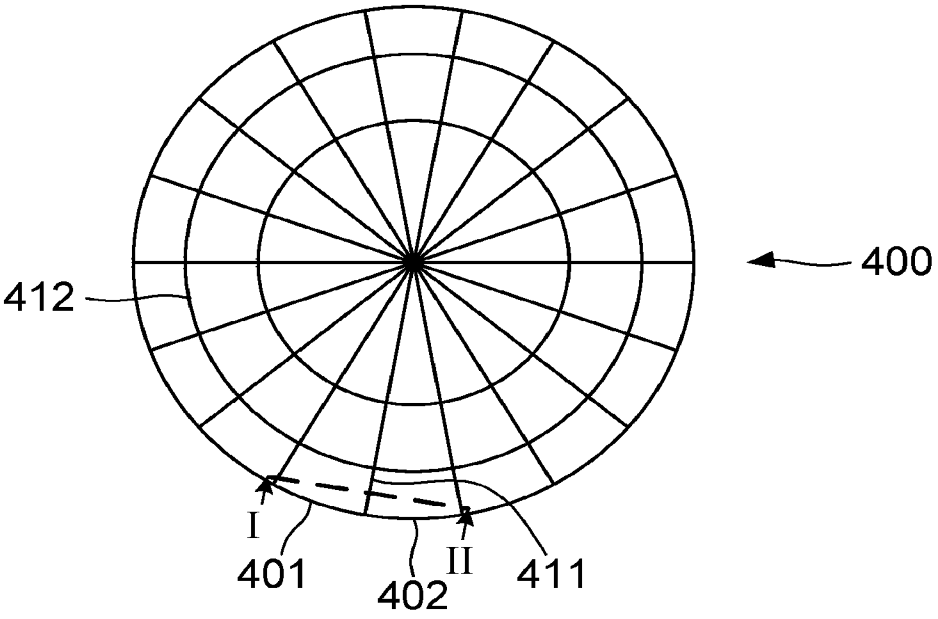
FIG. 5 illustrates a top view of the parabolic deployable membrane structure in the deployed configuration, according to an embodiment of the present invention.

In the present embodiment the plurality of second regions 411, 412 are arranged in strips along the radial and circumferential directions when the membrane is in the deployed configuration, as shown in FIG. 5. In other embodiments the plurality of second regions may be arranged in a different configuration, depending on the final shape of the deployed reflector and on the chosen folding mechanism. For example, in some embodiments the membrane may be configured to form the reflector for an offset antenna. In an offset antenna the reflector may have an asymmetric shape. For example, a reflector for an offset antenna can be formed as a section of a symmetric paraboloid. When the reflector has an asymmetric shape, the second regions may not be arranged along radial or circumferential directions since a different folding arrangement may be required.

Figure 6:
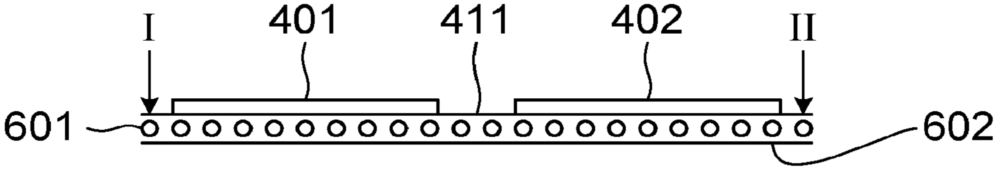
FIG. 6 illustrates a cross-sectional view through the parabolic deployable membrane structure, according to an embodiment of the present invention.

FIG. 6 illustrates a cross-sectional view through two adjacent regions of high-stiffness material 401, 402 in the parabolic deployable membrane structure 400. In the present embodiment the membrane comprises an underlying substrate which extends throughout the entire membrane, that is to say, through all of the first and second regions 401, 402, 411, 412. The substrate may be formed of any suitable material, and in the present embodiment is formed from a triaxial carbon fibre weave embedded in a silicone matrix. The plurality of first regions 401, 402 can be formed from a stiffer material, such as carbon fibre composite with different fibre densities and/or orientations to the substrate. In some embodiments the plurality of first regions 401, 402 may use a different matrix material to the more compliant second regions 411, 412. For example, the plurality of first regions 401, 402 may be formed from a carbon fibre plain weave, tissue or any other closed cell weave. The plurality of first regions 401, 402, which may be referred to as gores, can be integrated into the membrane during a moulding process.

As shown in FIG. 6, in the present embodiment the substrate comprises a plurality of first fibres 601 that are distributed over the plurality of first regions 401, 402 and the plurality of second regions 411, 412, and which are embedded in a compliant matrix 602. Each of the first regions 401, 402 comprises a plurality of second fibres which are confined to the plurality of first regions, for example in the form of a plain weave, tissue or other closed cell weave. The second fibres act to reinforce the membrane in the first regions 401, 402, assisting in maintaining the desired shape of the membrane in the deployed configuration. As described above, the first fibres may also serve to provide an electrical connection between adjacent regions of the membrane, when electrically-conducting fibres are used.

Figure 7:
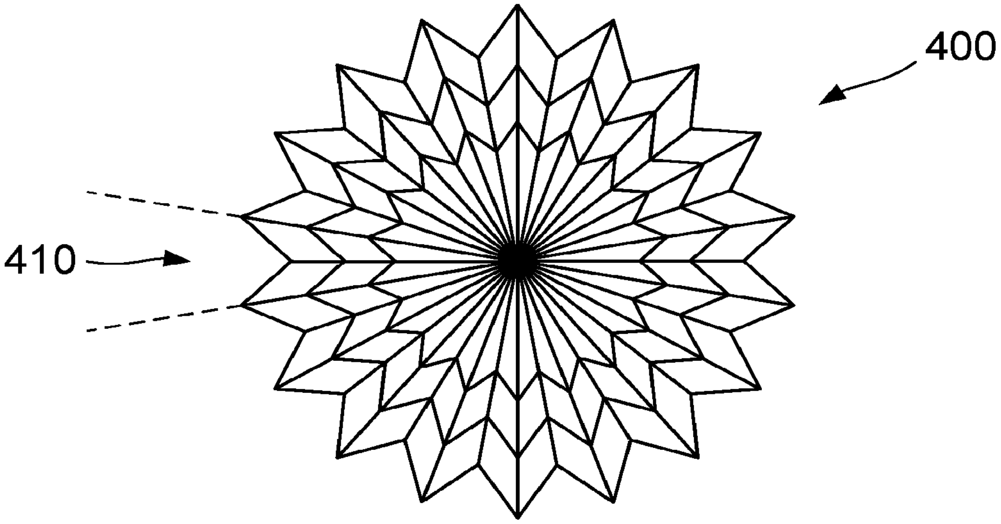
FIG. 7 illustrates a top view of the parabolic deployable membrane structure in a partially-collapsed configuration, according to an embodiment of the present invention.
Figure 8A:
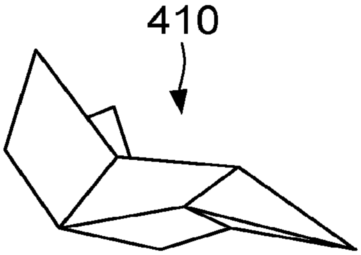
FIGS. 8A to 8C is a sequence of diagrams illustrating a folding arrangement of one segment of the parabolic deployable membrane structure as the structure is put into the collapsed configuration, according to an embodiment of the present invention.
Figure 8B:
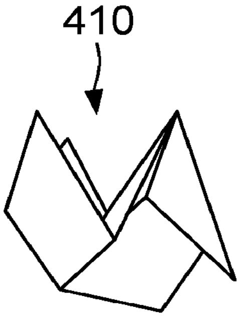
Figure 8C:
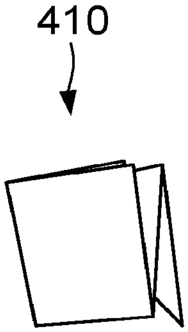

FIG. 7 illustrates a top view of the parabolic deployable membrane structure 400 in a partially-collapsed configuration, and FIGS. 8A to 8C is a sequence of diagrams illustrating a folding arrangement of one segment 410 of the parabolic deployable membrane structure 400 as the structure is put into the collapsed configuration. As shown in FIGS. 7 and 8A to 8C, the arrangement of lower-stiffness regions along the radial and circumferential directions allows the parabolic membrane to be folded into a small volume in the collapsed configuration, achieving a high stowage efficiency. The membrane can subsequently be unfolded into the deployed configuration to provide a parabolic reflector with a large surface area relative to the diameter of the structure in the collapsed configuration. The parabolic reflector can be included in a deployable antenna comprising an antenna feed for transmitting or receiving a signal via the parabolic deployable membrane structure, when the membrane is in the deployed configuration.

Figure 9:
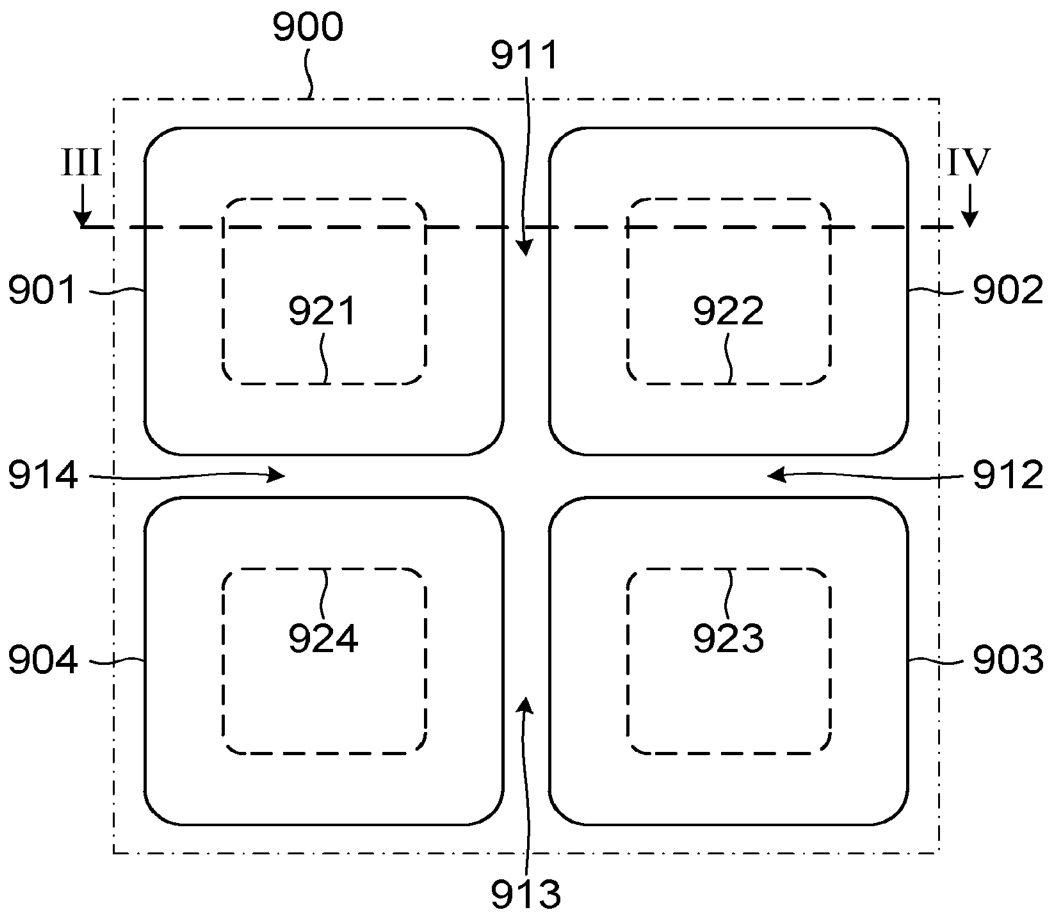
FIG. 9 illustrates a deployable membrane structure comprising a plurality of openings formed in the higher-stiffness regions, according to an embodiment of the present invention.
Figure 10:
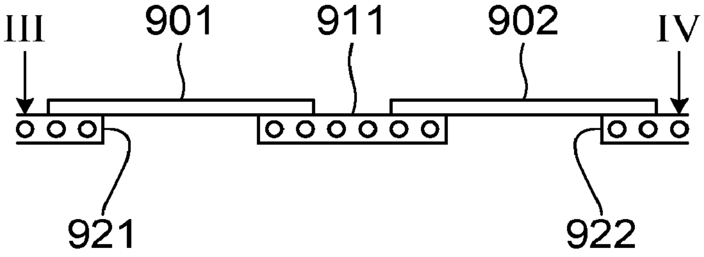
FIG. 10 illustrates a cross-sectional view through the deployable membrane structure of FIG. 9.

Referring now to FIGS. 9 and 10, an embodiment is illustrated in which the membrane comprises a plurality of openings formed in the higher-stiffness regions, to reduce the overall mass of the deployable membrane structure. FIG. 9 illustrates a section of the membrane 900 in plan view, and FIG. 10 illustrates a cross-sectional view through the deployable membrane structure. The membrane 900 comprises a plurality of first regions of higher-stiffness material which are integrally connected to one another via a plurality of second regions of lower-stiffness material 911, 912, 913, 914. As in the embodiment shown in FIG. 6, the deployable membrane structure of the present embodiment comprises an underlying substrate and a plurality of gores 901, 902, 903, 904 which serve to reinforce the substrate in each of the first regions.

The structure 900 further comprises a plurality of openings 921, 922, 923, 924 formed in the underlying substrate. The openings 921, 922, 923, 924 serve to reduce the mass of the underlying substrate, while the integrated gores 901, 902, 903, 904 overlay respective ones of the openings 921, 922, 923, 924. The gores serve to reinforce the structure in the plurality of first regions to provide the necessary stiffness in the plurality of first regions, and may also be referred to as reinforcing members. Each gore 901, 902, 903, 904 may extend across the underlying opening in the substrate so as to maintain a continuous surface of the membrane in the respective first region. Here, it will be appreciated that terms such as “underlying” and “overlay” are used for convenience merely to convey the relative positions of certain elements of the structure, and should not be construed as implying a particular orientation of the membrane structure while the antenna is in operation.

Whilst certain embodiments of the invention have been described herein with reference to the drawings, it will be understood that many variations and modifications will be possible without departing from the scope of the invention as defined in the accompanying claims.

The invention claimed is:

1. A deployable membrane structure for an antenna, the deployable membrane structure comprising:

a membrane comprising a plurality of first regions of higher-stiffness material integrally connected via one or more second regions of lower-stiffness material, wherein the one or more second regions are formed from compliant material configured to permit the membrane to be folded into a collapsed configuration and subsequently unfolded into a deployed configuration, and are arranged so as to allow adjacent ones of the plurality of first regions to be folded so as to lie against one another, wherein the membrane comprises:

a substrate;

one or more reinforcing members disposed in one of the plurality of first regions to reinforce the membrane in said one of the plurality of first regions; and one or more openings formed in the substrate beneath said one or more reinforcing members.

2. The deployable membrane structure of claim 1, wherein in the collapsed configuration adjacent ones of the plurality of first regions are folded about a respective one of the one or more second regions which connects said adjacent first regions, so as to lie against one another.

3. The deployable membrane structure of claim 2, wherein the membrane comprises a continuous matrix extending throughout the plurality of first regions and the one or more second regions.

4. The deployable membrane structure of claim 3, wherein the membrane is formed of a composite material comprising a plurality of fibres in a compliant matrix.

5. The deployable membrane structure of claim 2, wherein the membrane is configured to adopt a parabolic form in the deployed configuration.

6. The deployable membrane structure of claim 2, wherein the plurality of first regions are electrically connected to one another.

7. The deployable membrane structure of claim 1, wherein the membrane comprises a continuous matrix extending throughout the plurality of first regions and the one or more second regions.

8. The deployable membrane structure of claim 7, wherein the membrane is formed of a composite material comprising a plurality of fibres in a compliant matrix.

9. The deployable membrane structure of claim 8, wherein the plurality of first regions comprise material with a higher fibre density than the one or more second regions, and/or comprise a first matrix material having a higher stiffness than a second matrix material included in the one or more second regions.

10. The deployable membrane structure of claim 9, wherein the plurality of fibres comprise:

a plurality of first fibres distributed over the plurality of first regions and the one or more second regions; and a plurality of second fibres confined to the plurality of first regions, wherein the plurality of second fibres act to reinforce the membrane in the plurality of first regions.

11. The deployable membrane structure of claim 8, wherein the plurality of fibres are carbon fibres.

12. The deployable membrane structure of claim 1, wherein the membrane is configured to adopt a parabolic form in the deployed configuration.

13. The deployable membrane structure of claim 12, wherein the second regions are arranged in strips along the radial and circumferential directions when the membrane is in the deployed configuration.

14. The deployable membrane structure of claim 1, wherein the plurality of first regions are electrically connected to one another.

15. The deployable membrane structure of claim 14, wherein adjacent ones of the plurality of first regions are spaced apart from each other by a respective one of the one or more second regions, and said adjacent ones of the plurality of first regions and said respective one of the one or more second regions are electrically connected to one another.

16. The deployable membrane structure of claim 15, wherein the plurality of first regions and the one or more second regions are formed of a composite material comprising electrically conductive fibres.

17. The deployable membrane structure of claim 16, wherein the plurality of fibres are carbon fibres, and the composite material is a carbon fibre reinforced silicone CFRS composite.

18. The deployable membrane structure of claim 1, wherein adjacent ones of the plurality of first regions are spaced apart from each other by a respective one of the one or more second regions.

19. The deployable membrane structure of claim 1, wherein said one or more reinforcing members extend across the one or more openings in the substrate so as to maintain a continuous surface of the membrane in said one of the plurality of first regions.

20. A deployable antenna comprising:

the deployable membrane structure of claim 1, configured to form a primary reflector of the antenna when in the deployed configuration; and an antenna feed for transmitting or receiving a signal via the deployable membrane structure when the membrane is in the deployed configuration.

* * * * *